(12) United States Patent
Boshernitzan et al.

(10) Patent No.: US 10,082,878 B2
(45) Date of Patent: *Sep. 25, 2018

(54) METHOD FOR CONTROLLING AND CALIBRATING A DEVICE WITH A GESTURE

(71) Applicant: Swan Solutions Inc., Houston, TX (US)

(72) Inventors: Yaniv Boshernitzan, Houston, TX (US); Ohad Nezer, Houston, TX (US)

(73) Assignee: Swan Solutions, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,969

(22) Filed: Nov. 11, 2016

(65) Prior Publication Data

US 2017/0131783 A1     May 11, 2017

Related U.S. Application Data

(60) Provisional application No. 62/254,028, filed on Nov. 11, 2015.

(51) Int. Cl.
    *G05B 11/01*     (2006.01)
    *G06F 3/01*      (2006.01)
(52) U.S. Cl.
    CPC .................... *G06F 3/017* (2013.01)
(58) Field of Classification Search
    None
    See application file for complete search history.

(56) References Cited

U.S. PATENT DOCUMENTS

| | | |
|---|---|---|
| 5,971,761 A | 10/1999 | Tillman, Sr. |
| 8,228,315 B1 | 7/2012 | Starner et al. |
| 8,788,978 B2 | 7/2014 | Stedman et al. |
| 2010/0001992 A1 | 1/2010 | Van Loenen et al. |
| 2012/0249416 A1 | 10/2012 | Maclocci et al. |
| 2013/0321346 A1 | 12/2013 | Tyler et al. |
| 2014/0111483 A1 | 4/2014 | Harrison et al. |
| 2014/0149754 A1* | 5/2014 | Silva ............... G06F 1/3212 713/300 |
| 2014/0225824 A1 | 8/2014 | Shpunt et al. |

(Continued)

FOREIGN PATENT DOCUMENTS

WO     2013165348     11/2013

*Primary Examiner* — Thomas McCormack
(74) *Attorney, Agent, or Firm* — Andrew W. Chu; Craft Chu PLLC

(57) ABSTRACT

A sensor of a control system can be controlled by commands based on knocking gestures. The method includes installing a housing with a sensor, generating a contact interaction, detecting the data signals corresponding to the contact interaction, determining a status data pattern, matching the detected profile with a status gesture profile associated with a command to switch the sensor to a listening status, and controlling terminal devices when the sensor is in the listening status. The control system can also use gestures to control the terminal devices. The method includes manually setting or calibrating the gesture profiles according to audio parameters for sound and vibration parameters for vibrations. The gesture profiles can include a sensitivity factor, surface selection factor, and a threshold factor.

12 Claims, 7 Drawing Sheets

(56) References Cited

U.S. PATENT DOCUMENTS

2014/0327526 A1* 11/2014 Bess .................. G01H 1/00
340/12.52
2015/0301615 A1* 10/2015 Kasar ................ G06F 3/017
345/156

\* cited by examiner

METHOD FOR CONTROLLING AND CALIBRATING A DEVICE WITH A GESTURE

CROSS-REFERENCE TO RELATED APPLICATIONS

The present application claims priority under 35 U.S.C. Section 119(e) from U.S. Provisional Patent Application Ser. No. 62/254,028, filed on 11 Nov. 2015, entitled "METHOD FOR CONTROLLING AND CALIBRATING A DEVICE WITH A KNOCKING GESTURE".

See also Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to methods for controlling for a device with gestures. More particularly, the present invention relates to methods for calibrating the device to detect knocking gestures against a surface. Even more particularly, the present invention relates to methods for forming the gesture profiles associated with commands with manual or calibrated factors.

2. Description of Related Art Including Information Disclosed Under 37 CFR 1.97 and 37 CFR 1.98

With the development of electronic technology, products used daily are increasingly integrated with interactive features aiming to enhance the convenience of using them. Users now can use a controller, such as a remote, to adjust lights, curtains, a thermostat etc. An existing control method is a distinct remote controller associated with the output device to be controlled. Another existing control method is voice recognition technology. Voice recognition programs calibration to various pronunciations and particular accents. Furthermore, voice recognition is often impaired by background noise resulting in difficulties for the system to recognize commands.

Another recent controller system innovation is to build a control directly into the objects and structures in a person's surroundings. For example, computer tablets, touchscreen, and touchpads have begun to be integrated into furniture including built-in functions to control smart-devices around a home, business, or other environment. Smart tables have been built with touch-enabled screens that are able to receive touch-based gestures, and even computer touch-pads have become equipped with more advanced touch gesture vocabularies to interpret various touch-based motions associated to specific commands. These touch enabled screens and touch-pads are confined to a particular area dedicated as a touch surface area of the structure's surface.

Various patents and publications are available in the field of control interfaces based on hand or finger motions. U.S. Pat. No. 8,788,978, issued to Stedman et al on Jul. 22, 2014, teaches another gesture sensitive interface for a computer. The "pinch zoom" functionality is the subject matter, so that the detection of first and second interaction points, and the relative motion between the points are detected by sensors.

World Intellectual Property Organization Publication No. WO2013165348, published for Bess on Nov. 7, 2013, describes a system with at least three accelerometers disposed in different locations of an area with a surface to capture respective vibration data corresponding to a command tapped onto the surface by a user. A processing system receives the vibration data from each accelerometer, identifying the command and a location of the user from the vibration data. A control signal based on the command and the location is generated.

U.S. Patent Publication No. 20140225824, published for Shpunt et al on Aug. 14, 2014, discloses flexible room controls. A control apparatus includes a projector for directing first light toward a scene that includes a hand of a user in proximity to a wall of a room and to receive the first light that is reflected from the scene, and to direct second light toward the wall so as to project an image of a control device onto the wall. A processor detects hand motions within the projected field.

U.S. Patent Publication No. 20120249416, published for Maciocci et al on Oct. 4, 2012, describes another projection system with gesture identification. The projector is a unit worn on the body of the user to project onto surfaces, such as walls and tables. Spatial data is detected by a sensor array. Additional rendering operations may include tracking movements of the recognized body parts, applying a detection algorithm to the tracked movements to detect a predetermined gesture, applying a command corresponding to the detected predetermined gesture, and updating the projected images in response to the applied command.

U.S. Patent Publication No. 20100019922, published for Van Loenen on Jan. 28, 2010, is the known prior art for an interactive surface by tapping. Sound detection is filtered and interpreted either in the system to be controlled or else in the sensors themselves. The direction of movement of a hand stroking the surface can be interpreted as a command to increase or decrease a parameter, such as the sound volume level of a television, for example. Determination of the position of the user's hand is unnecessary.

For a prior art touch screen or touch pad device, there is a discrete boundary or differentiation between the touch and non-touch areas of a surface. A touch-sensitive region can be bound by the outer edge of a screen or touchpad that is integrated in the surface. Therefore, a command is often processed the moment a contact interaction occurs between a person's hand and the touchpad or touchscreen of an activated device. For a prior art light detection device, there is a discrete boundary of visible light. Only gestures within the field of projected light and only gestures made, when the project light is activated, are processed within the control system for commands of the terminal output.

For other control interface systems, an exterior surface is converted into an interactive zone for contact interactions, such that there is no longer a discrete boundary between touch and non-touch areas of the exterior surface. For example, when a bed is an exterior surface overlaid by an interactive zone, the entire bed generates data signals to be converted into a gesture. For example, a light projection on a wall forms an interactive zone, and the entire wall generates signals as any portion of the wall can reflect light back to a receiver. The hand of the user, the foot of the user, or a pet generates contact interactions within the system. For these control interface systems, there must be a way to distinguish gestures for association with commands and extraneous touches, motions, vibrations, or other physical parameters affecting the surface that are unrelated to gestures for the processing by the system. Voice recognition technology must be able to filter background noise in order to identify verbal commands from the user. Similarly, there is a need to filter background touches, motions, vibrations or other physical parameters in order to identify the gestures as commands from the user.

There are also control interface systems including a housing placed on a mounting surface, a sensor contained within the housing, a routing module connected to the sensor, a processing module connected to the routing module, and an output module connected to the processing module. The sensor forms an interactive zone defined by a range of the sensor, and the interactive zone is coordinated or aligned with the mounting surface. A contact interaction within the interactive zone is an event detected by the sensor and corresponds to a data signal. The event or contact interaction can be a knocking gesture, when the user physically engages in the interactive zone. The sensor detects the contact interaction and generates a corresponding data signal. The data signals are transmitted by the sensor as data inputs to the routing module. The routing module receives each data input from the sensor, and the processing module receives each data input from the routing module. The processing module will convert each data input into a detected profile and match the detected profile with a gesture profile. Since each gesture profile is associated with a command, the processing module transmits the command corresponding to the gesture profile matched to the detected profile to the output module.

It is an object of the present invention to provide a method for controlling a sensor of a system which controls a terminal device.

It is another object of the present invention to provide a method for controlling the resting status and listening status of a sensor so as to regulate power consumption.

It is an object of the present invention to provide a method for activating the sensor of a control system with gestures.

It is another object of the present invention to provide a method for activating the sensor for control system with gestures and controlling terminal devices with the control system with gestures.

It is still another object of the present invention to provide a method for forming commands to control the system based on knocking gestures and forming subsequent commands to control a terminal device based on knocking gestures.

It is an object of the present invention to provide an embodiment of the method for forming status commands and output commands.

It is another object of the present invention to provide an embodiment of the method for forming commands based on two memory sets of commands.

It is still another object of the present invention to provide an embodiment of the method for status commands for controlling a resting status and listening status of the sensor of the device as one memory set and commands for terminal devices as another memory set.

It is an object of the present invention to provide an embodiment of the method for calibrating the commands based on associations of each command and a corresponding gesture profile set by manual data input.

It is another object of the present invention to provide an embodiment of the method for calibrating the commands by setting the gesture profiles with various factors, such as sensitivity, surface selection, and threshold.

It is another object of the present invention to provide an embodiment of the method for calibrating the commands by setting the gesture profiles by calibrating contact interactions and corresponding calibrating data signals.

These and other objectives and advantages of the present invention will become apparent from a reading of the attached specification.

BRIEF SUMMARY OF THE INVENTION

A control system for terminal devices based on gestures can be activated by gestures. The sensor of the control system can be toggled between a resting status and a listening status by gestures. The resting status is a low power or sleep mode, and the listening status is a full power or active mode. The resting status of the sensor corresponds to a power level to detect contact interactions limited to toggling the status of the sensor. The listening status of the sensor corresponds to a higher power level to detect subsequent contact interactions for commanding terminal devices, including more complex commands for terminal devices connected through a server.

Embodiments of the method for controlling the sensor of a control system include installing a housing on a mounting surface by an engagement device. The housing contains a sensor and a microcontroller unit connected to the sensor. The sensor forms an interactive zone defined by a range of the sensor. The sensor starts in the resting status to save power. Then, a physical impact is made on the mounting surface so as to generate a contact interaction. The sensor detects the contact interaction as data signals, and the data signals are received from the sensor with the microcontroller unit. A status data pattern corresponding to the data signals of the contact interaction is determined with the microcontroller unit, and the status data pattern is matched to a status gesture profile. The status gesture profile is associated with a command to switch the sensor from the resting status to the listening status. Then, the command is sent to switch the sensor to the listening status, so that a terminal device can be controlled.

Additional embodiments include connecting a server in communication with the sensor and connecting the terminal device in communication with the server. Subsequent physical impacts on the mounting surface generate subsequent contact interactions, when the sensor is in the listening status and before the set time duration passes. These subsequent contact interactions are detected as subsequent data signals with the sensor, and a subsequent data pattern is determined with the microcontroller. The subsequent data pattern is transmitted to a routing module of the server, so that the processing module of the server can match the subsequent data pattern to a gesture profile associated with an output command for activity of a terminal device. Then, the activity is performed by the terminal device.

In some embodiments, two memory sets of commands are maintained. One set corresponds to status of the sensor, and the other set corresponds to activity of a terminal device. The same system can use gestures to activate its own sensor and to control terminal devices. Different libraries of commands can be accessed under the specific conditions.

Furthermore, formation of the memory sets is included in embodiments of the method of the present invention. Manual data input, such as setting a sensitivity factor, choosing a surface selection, and setting a threshold factor, form each pre-determined gesture profile. The gesture profile is manually set by the user, so that the status data pattern or any subsequent data pattern must match these pre-determined factors of the gesture profile. Once matched, the output command is identified. Alternatively, the pre-determined gesture profile is calibrated by a calibration contact interaction. For example, three knocks on the wall can be detected and associated with an output command. A subsequent contact interaction of three knocks on the wall would be associated with that output command to be performed. The user can choose the meaning of three knocks.

DETAILED DESCRIPTION OF THE INVENTION

The control system of the present invention enables gestures to control terminal devices. In the method of the present invention, the sensor of the control system is toggled between a resting status and a listening status. The resting status is a low power or sleep mode. The sensor in the resting status only detects whether to switch out of resting status to listening status. In the listening status, gestures control the terminal devices. In the present invention, the method of toggling is controlled by gestures as well.

Figure 1:
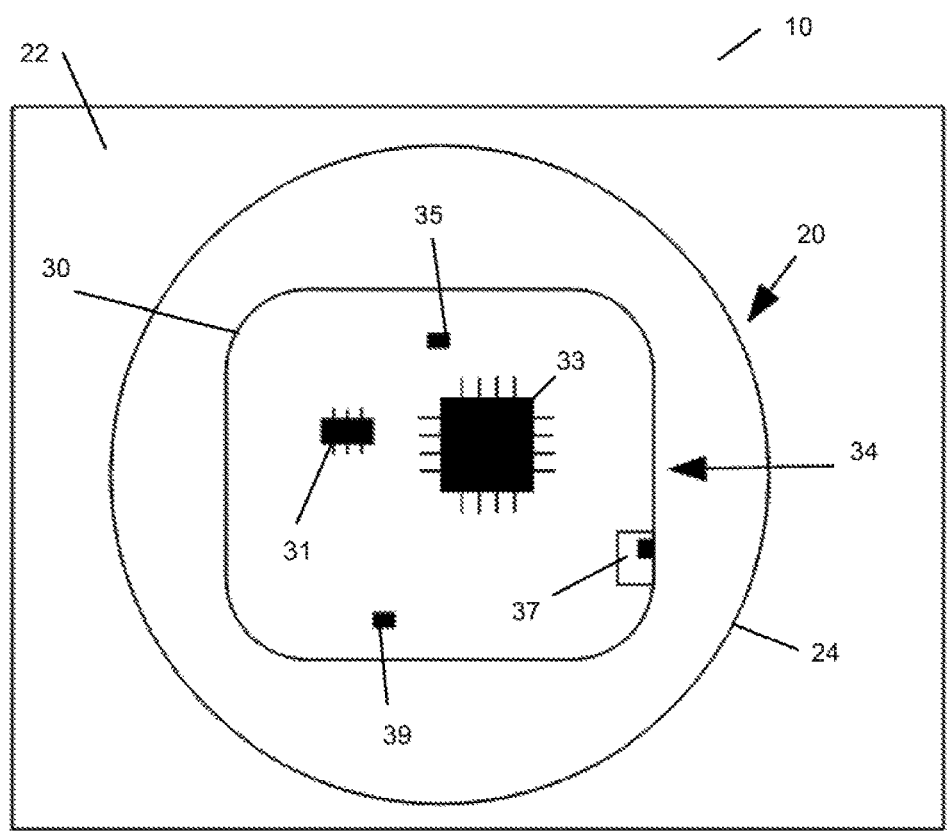
FIG. 1 is a schematic view of an embodiment of the control system of the present invention with the sensor.
Figure 2:
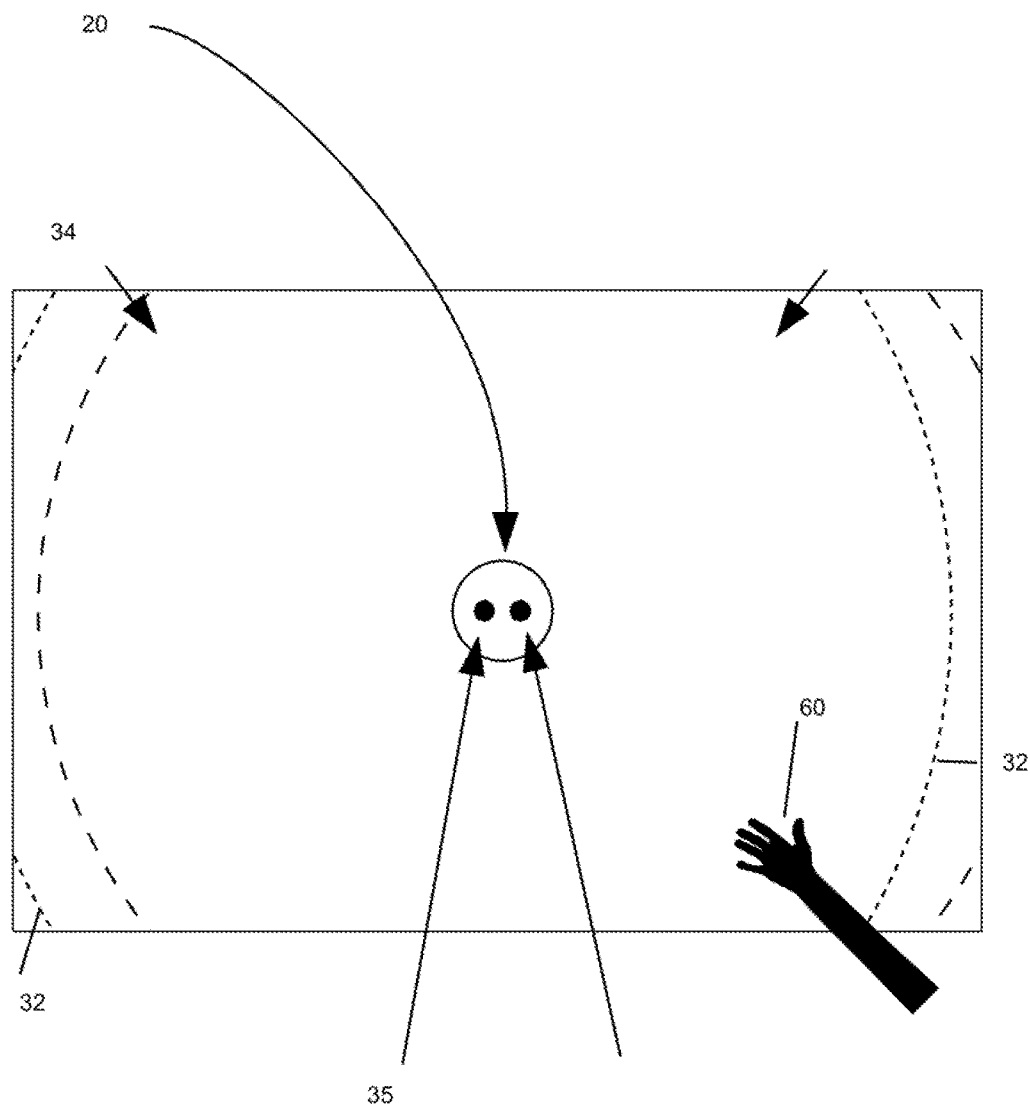
FIG. 2 is a top plan view of another embodiment of the housing with the sensor on the mounting surface of the present invention.
Figure 3:
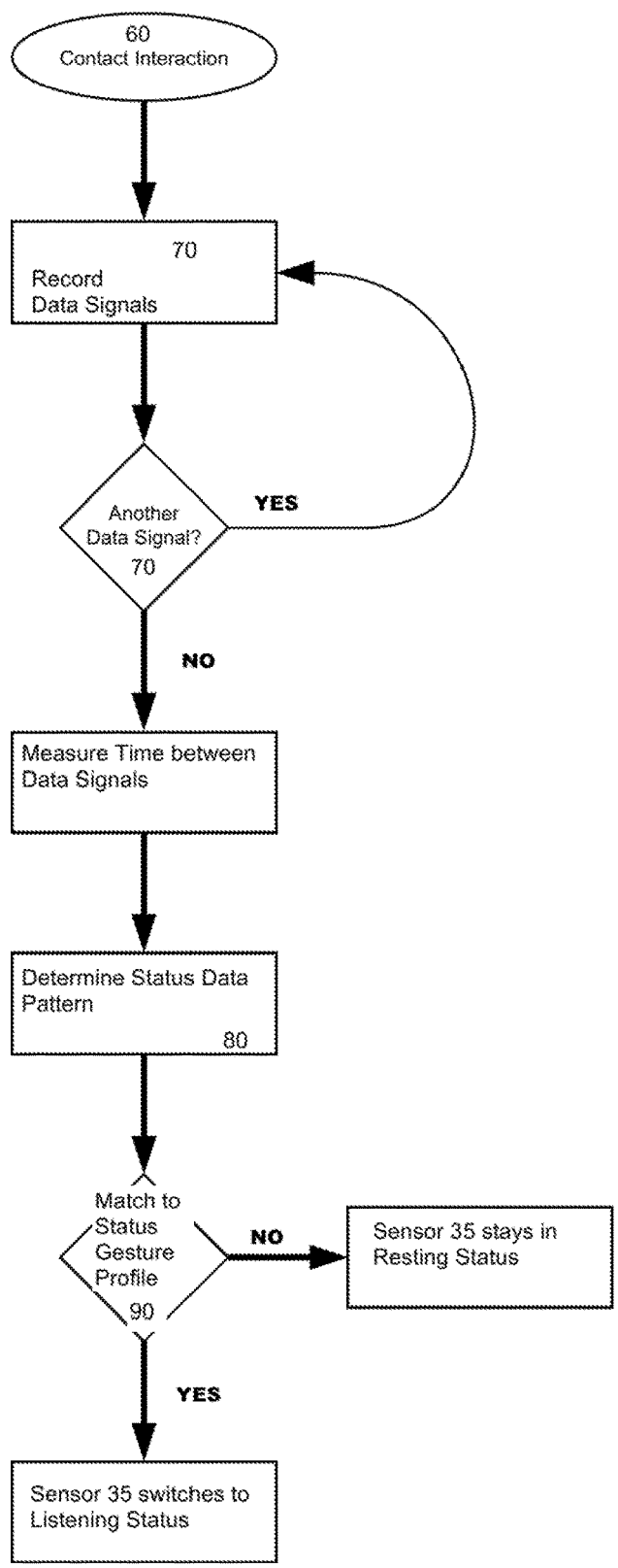
FIG. 3 is flow diagram of the embodiment of the method for controlling the sensor in the resting status with low power and the listening status with the full power.

FIGS. 1-3 show the control system 10 with the housing 20 comprised of an engagement means 24 for a mounting surface 22. Planar surfaces, such as tables and walls, as well as non-planar surfaces, such as beds, can be mounting surfaces 22. There is a rigid positioning of the sensor unit 35 relative to the mounting surface 22 through the housing 20. Any sound or vibration or both of the mounting surface 22 is transmitted to the sensor unit 35. The engagement means 24 attaches the sensor unit 35 and reduces damping so that the sensor unit 35 more accurately detects contact interactions 60 on the mounting surface 22.

The control system 10 of the present invention includes a sensor unit 35 as shown in FIG. 1. The housing 20 contains the printed circuit board 30 comprised of a board 34 with a flash memory 31, microcontroller unit (MCU) 33, the sensor unit 35, antenna 37, and light emitting diode 39. The microcontroller unit 33 and antenna 37 can have wifi capability for communication with a server 40 (See FIG. 4). The microcontroller unit 33 is connected to the sensor unit 35, and the flash memory 31. The rigid position of the printed circuit board 30 establishes the transmission of the contact interaction to the sensor unit 35. The engagement means 24 is in a fixed position relative to the sensor unit 35. Other parts in the housing 20 include batteries 36 as a known power supply for the control system 10. The batteries 36 power the sensor unit 35. The stable construction of the housing 20 and the sensor unit 35 enable the accurate and efficient conversion of the contact interactions 60 as gestures into commands for a terminal device 50 (See FIG. 4).

In this embodiment of the control system 10, FIG. 2 shows the sensor unit 35 forming a respective zone 32. The sensor unit 35 forms an interactive zone 32 defined by a range 34 of the sensor unit 35. A contact interaction 60 with the mounting surface 22 within the interactive zone 32 is detected by the sensor unit 35 as data signals 70.

In the present invention, the sensor unit 35 has a first power consumption level so as to be in a resting status and a second power consumption level so as to be in a listening status. In the activated and fully powered control system 10, the sensor unit 35 is in the listening status. The microcontroller 33 permits communication to a server in the activated and fully powered control system 10. In the activated and power saving control system 10, the sensor unit 35 is in the resting status, and the sensor unit 35 only detects data signals for toggling the sensor unit 35. Other components of the control system 10, such as the microcontroller 33, can also be in respective resting status for lower power consumption. For example, the microcontroller 33 is not transmitting to the server 40 in the corresponding resting status of the microcontroller for one type of lower power consumption.

In the method of the present invention, FIG. 3 is a flow diagram showing the data signals 70 of the sensor unit 35 in relation to the microcontroller unit 33. The contact interaction 60 generates the data signals 70 of the sensor unit 35 through the housing 20. In the present invention, the contact interaction 60 is comprised of an impact or plurality of impacts associated with the mounting surface 22. In some embodiments, the impact or plurality of impacts on the associated surface is the contact interaction 60, not an impact on the mounting surface 22. The impacts are coordinated or correspond or translate to the mounting surface 22 for detection by the sensor unit 35 through the mounting surface 22 as data signals 70.

According to FIG. 3, the microcontroller unit 33 receives the data signals 70 from the sensor unit 35. These data signals 70 correspond to the contact interaction 60 associated with the mounting surface 22. The microcontroller unit 33 determines the status data pattern 80 corresponding to the data signals 70 of the contact interaction 60. The microcontroller unit 33 also matches the status data pattern 80 with a status gesture profile 90. The status gesture profile 90 is associated with a switch command to change the status of the sensor unit 35 and other components of the control system 10, such as enabling communication with a server by the microcontroller unit 33. The control system 10 as the activated power saving system has lower power consumption as an energy saving or sleep or slack mode or resting status. However, control system 10 remains able to detect the contact interaction 60 corresponding to the status gesture profile 90. The control system 10 remains ready to change into the higher power consumption as an activated and fully powered system. The control system 10 can power the microcontroller unit 33 to connect to the server 40 as the activated and fully powered system (See FIG. 4). The status gesture profile 90 can be comprised of a threshold level for the status data pattern 80. Any data pattern above the threshold level matches the status gesture profile 90.

The control system 10 remains able to detect the contact interaction 60 corresponding to the status gesture profile 90, such that the control system 10 can toggle between the resting status and listening status of the sensor unit 35 by gestures. An elderly person in a wheelchair is able to regulate turning on or turning off the control system 10 by knocking twice on a tabletop instead of locating a dedicated button on the housing 20. The control system 10 is not required to maintain high power consumption.

In the embodiments of the control system 10, the data signals 70 have a respective defined peak corresponding to each impact, a measured time period between each defined peak, and a defined time period after a last defined peak. Each peak is a distinct spike in the data being detected with a quick increase from a baseline or background activity. A status data pattern 80 for each contact interaction 60 is determined by each defined peak and the defined time period after the last defined peak, and each measured time period between each defined peak, if there is a plurality of impacts. FIG. 3 shows an embodiment for the contact interaction 60 comprised of one impact or a plurality of impacts. A single knock or a sequence of knocks can be a contact interaction 60. The control system 10 determines the status data pattern 80 for contact interactions 60 comprised of a single tap, three quick knocks, two taps, and other sequences. Contact interactions 60, such as tapping, knocking, sweeping, and dragging, can be detected by the sensor unit 35 as data signals 70.

The relationship between the microcontroller 33 and the sensor unit 35 is timed. The toggle to listening status of the sensor unit 35 is limited by time. Only subsequent contact interactions within a set time duration maintain the listening status of the sensor 35. The method distinguishes between accidentally switching to active or listening status and purposely switching to active or listening status and the higher power consumption level. Once switched, the user must make a subsequent contact interaction within a predetermined amount of time, so that the subsequent contact interaction is detected. The control system 10 prevents accidental powering of the sensor unit 35 and avoids unnecessary power consumption.

Now that the control system 10 can be set as an activated and fully powered system, the method is ready to detect subsequent contact interactions for controlling the terminal device. The subsequent contact interactions will be detected as subsequent data signal to determine a subsequent data pattern, and the server can determine a command for the terminal device with a particular processing of the subsequent data pattern.

Figure 4:
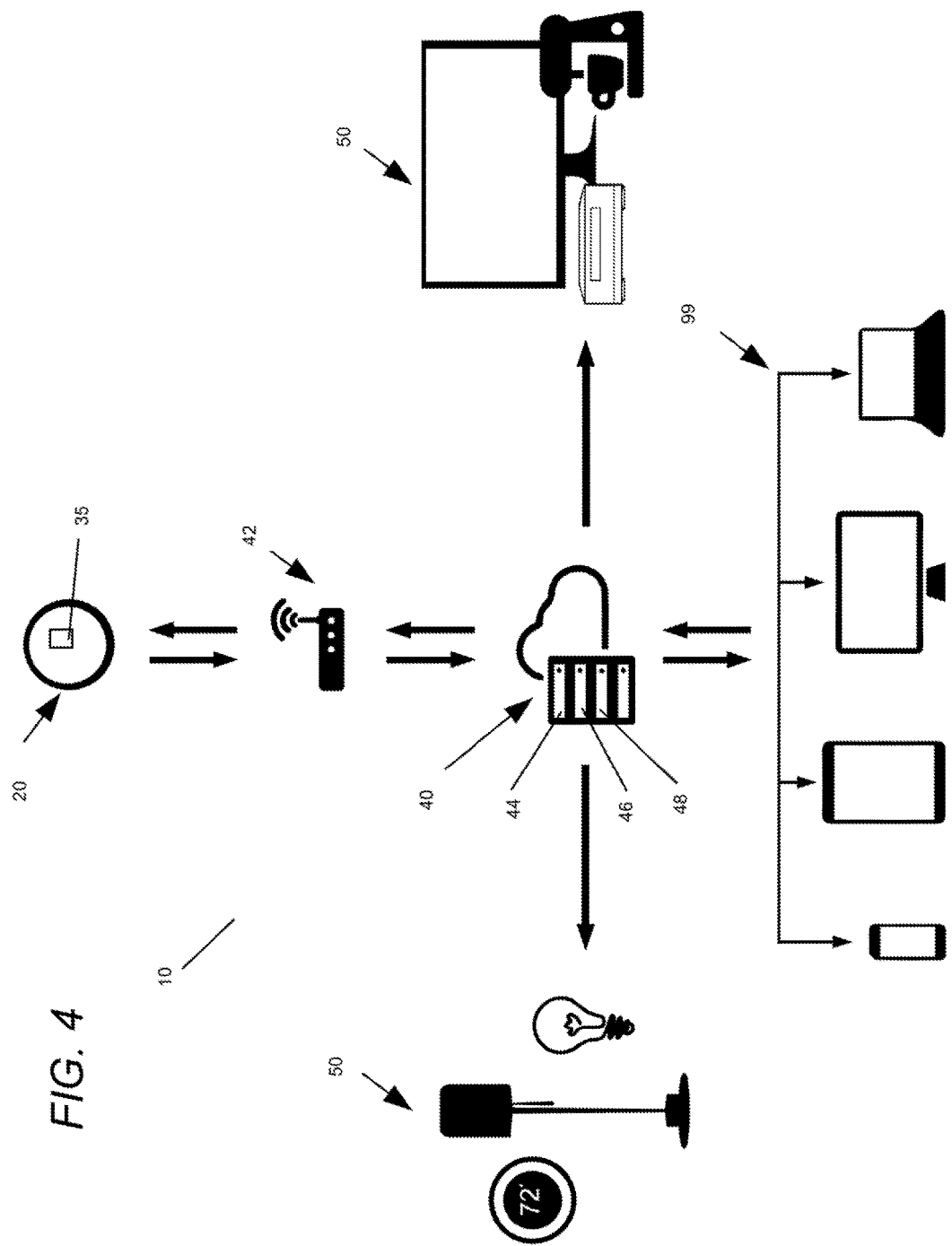
FIG. 4 is a schematic view of another embodiment of the control system of the present invention with the server and terminal device for subsequent contact interactions.
Figure 5:
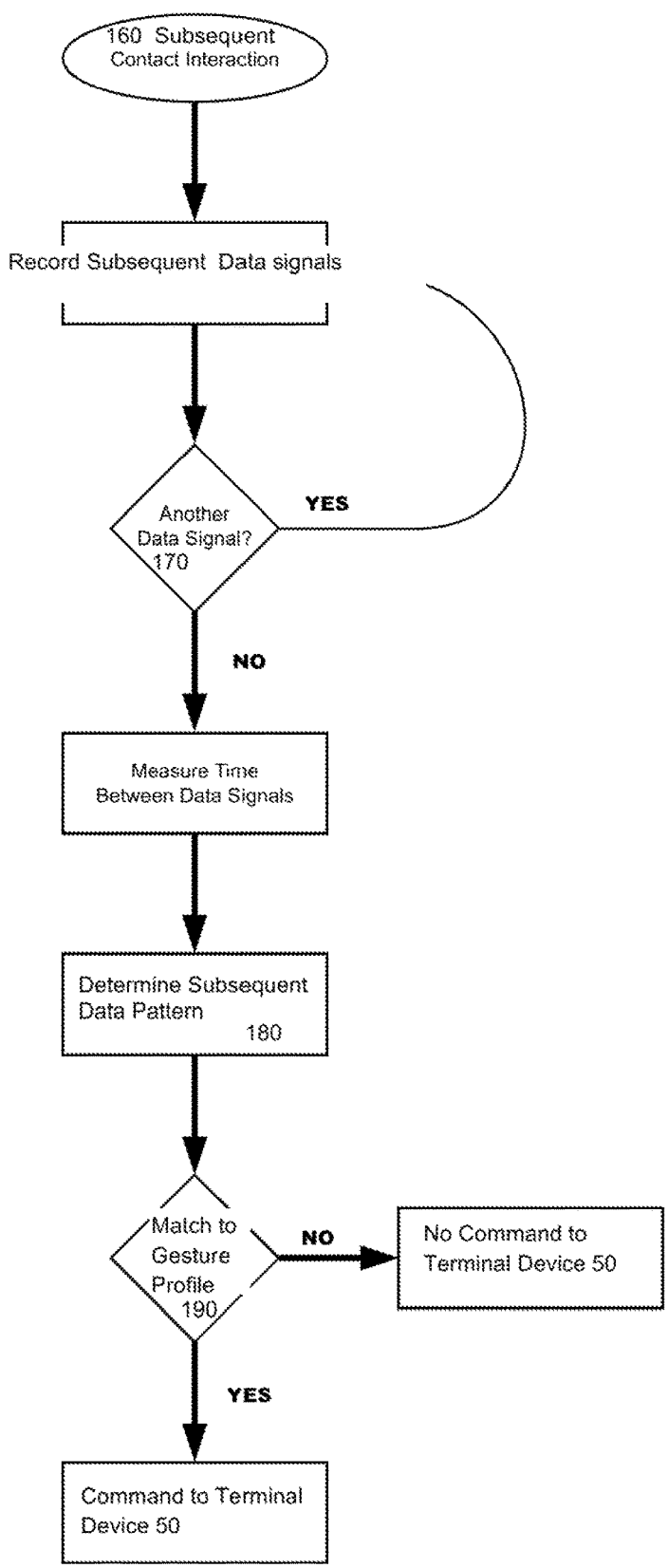
FIG. 5 is flow diagram of the embodiment of the method for controlling a terminal device with the sensor in the listening status, according to the embodiment of the present invention of FIG. 4.

FIG. 4-5 show an alternative embodiment of the invention, with the control system 10 including a housing 20, a sensor unit 35 within the housing 20, a server 40 in communication with the sensor unit 35, and a terminal device 50 in communication with the server 40. Interfaces 99 are connected to the server 40 in order to interact with the control system 10. The interfaces 99 can include computers, laptops, tablets and smartphones. FIG. 4 shows a variety of different interfaces 99. The interfaces 99 allow the user to adjust the settings of the control system 10. Gestures by a user associated with the mounting surface 22 regulate the control system 10 and control the terminal devices 50. In some embodiments, the devices that are interfaces 99 could also be terminal devices 50. The server 40 is in communication with the sensor unit 35, when the system is an activated and fully powered system. The communication can be wireless or wired. The connection between the server 40 and the sensor unit 35 can include a router 42, as shown in FIG. 4, and may also include wifi, Bluetooth, local area network, or other connections. In FIG. 4, the server 40 can be comprised of a routing module 44, a processing module 46 being connected to the routing module 44, and an output module 48 connected to the processing module 46.

The flow chart of FIG. 5 shows the method of the present invention for controlling output as activity of a terminal device 50 by a subsequent contact interaction 160. The subsequent data signals 170 from the sensor unit 35 correspond to other subsequent contact interactions 160 associated with the mounting surface 22, when the sensor unit 35 is in listening status. The microcontroller 33 determines the subsequent data pattern 180 corresponding to the subsequent data signals 170 of the subsequent contact interaction 160. The processing module 46 matches the subsequent data pattern 180 with a gesture profile 190, after the subsequent data pattern 180 is received by the routing module 44 from the microcontroller 33. The gesture profile 190 is associated with a command for the terminal device 50, such as power off or change channels or dim intensity. Then, the output module 48 transmits the command to the terminal device 50. For example, when the terminal device 50 is a television, another contact interaction 160 of three fast knocks can be detected as subsequent data signals 170 to generate a subsequent data pattern 180. The subsequent data pattern 180 can be matched to a gesture profile 190 associated with changing channels up one channel. The output module 48 communicates the command to change channels up one channel through the server 40 to the television as the terminal device 50. Thus, that same elderly person in a wheelchair is able to activate the control system 10 by knocking so that the person can change channels by knocking twice on a tabletop instead of locating a dedicated button on the television or fiddling with a touchscreen on a smartphone.

In the control system 10, the terminal device 50 can be an appliance, such as a television, stereo or coffee machine. Alternatively, the terminal device 50 may be a device running software, a light or climate regulator, such as a thermostat, fan or lighting fixture. The activity of the terminal device 50 depends upon the terminal device 50. The activity is dedicated to the particular terminal device 50. The command associated with the gesture profile 190 relates to the particular terminal device 50. Knocking twice on a tabletop can be converted by the control system 10 into a command to change channels on a television or to lower the temperature of a thermostat or to create an entry in an online calendar software program on a computer. The control system 10 can also be used with multiple terminal devices 50. A gesture profile 190 for a command is specific for an activity for a particular terminal device 50. More than one terminal device 50 can be connected to the server 40 to receive the commands from gestures by the user against the mounting surface 22.

In the embodiments of the control system 10, each of the subsequent data signals 170 have a respective defined peak corresponding to each impact, a measured time period between each defined peak, and a defined time period after a last defined peak. These peaks correspond to vibration data or sound data, depending upon the type of sensor. Each peak is a distinct spike in the data being detected with a quick increase from a baseline or background activity. The subsequent data pattern 180 for each subsequent contact interaction 160 is determined by each defined peak and the defined time period after the last defined peak, and each measured time period between each defined peak, if there is a plurality of impacts.

FIG. 5 shows an embodiment for the subsequent contact interaction 160 comprised of one impact or a plurality of impacts. A single knock or a sequence of knocks can be a subsequent contact interaction 160. The control system 10 determines the subsequent data pattern 180 for subsequent contact interactions 160 comprised of a single tap, three quick knocks, two taps, and other sequences. Subsequent contact interactions 160, such as tapping, knocking, sweeping, and dragging, can be detected by the sensor unit 35.

Figure 7:
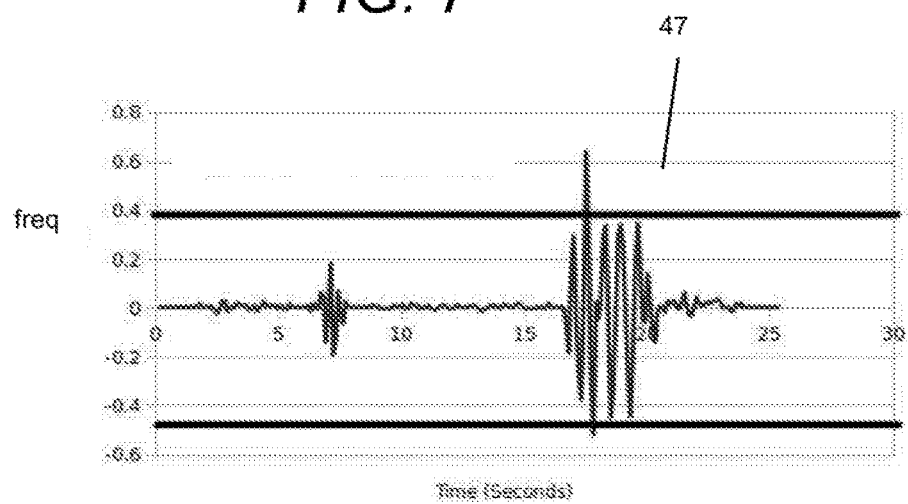

In the present invention, when the contact interaction is a knocking gesture comprised of a sound, the sensor unit 35 can be an acoustic sensor. The contact interaction is an audio signal corresponding to the sound. The audio signal has audio parameters, including volume, intensity, duration, a frequency pattern, and pitch. Select audio parameters determine a detected profile of the knocking gesture in the processing module 45. FIG. 7 shows a schematic view of graph illustration of a detected profile 47. In some embodiments, the sound is comprised of a plurality of sound units, such as multiple knocks. The multiple knocks are also a contact interaction, and the audio signal corresponds to each sound unit of the sound. The audio signal can have additional parameters, such as volume, intensity, duration, a frequency pattern, and pitch and sequence of each parameter for each sound unit. There is a sequence parameter of peaks for the multiple sound units, and there is frequency pattern, showing three quick taps or two slow knocks, with different time gaps between peaks, corresponding to impacts on the surface. FIG. 7 shows the detected profile 47 with two peaks of volume, corresponding to two knocks.

Figure 6:
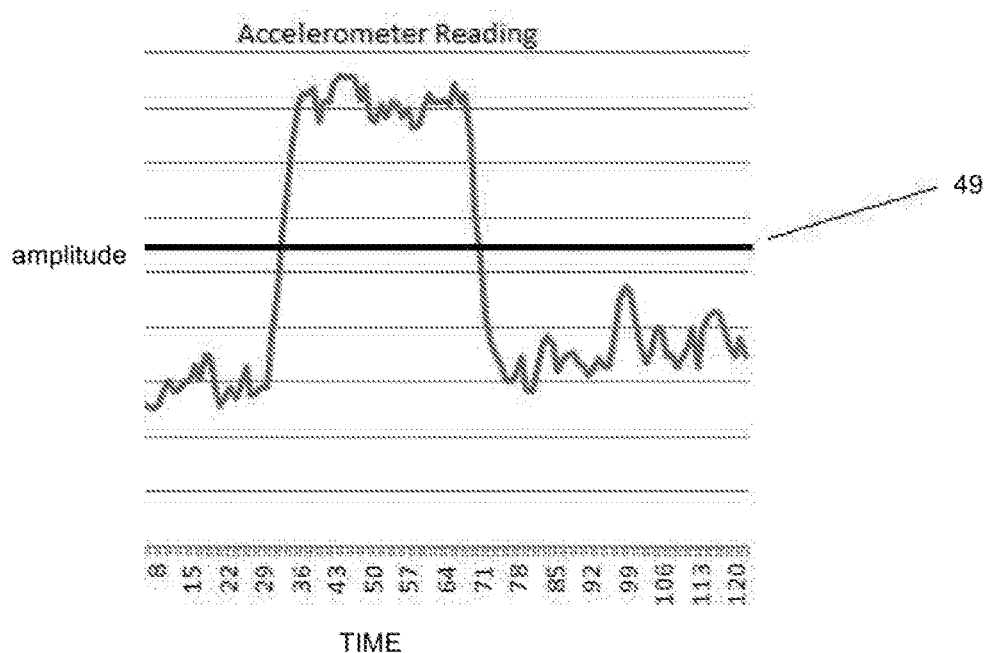
FIGS. 6 and 7 are graph illustrations of embodiments of detected profiles of the control interface system of the present invention.

When the contact interaction is a knocking gesture comprised of a vibration, the sensor unit 35 can be an accelerometer. The contact interaction is a vibration signal corresponding to the vibration. The vibration signal has vibration parameters, including amplitude, intensity, duration, and amplitude pattern. Select vibration parameters determine a detected profile of the knocking gesture in the processing module 45. FIG. 6 shows a schematic view of graph illustration of a detected profile 49. In some embodiments, the vibration is comprised of a plurality of vibration units, such as multiple knocks. The multiple knocks are also a contact interaction, and the vibration signal corresponds to each vibration unit of the vibration. The vibration signal can have additional parameters, such as amplitude, intensity, duration, a vibration pattern, and pitch and sequence of each parameter for each vibration unit. The peaks of the contact interaction can also be detected with an accelerometer, and the sequence and time between peaks can be known. FIG. 6 shows the detected profile 49 with one peak of amplitude, corresponding to one knock.

The present invention includes maintaining a first memory set of commands in the microcontroller, and maintaining a second memory set of commands in the processing module. In some embodiments, the first memory set can also be maintained in the processing module. The commands of the first memory set are status commands for the resting status or listening status of the sensor. Each status command still corresponds to a pre-determined status gesture profile as a type of output command. The sensor can also be considered a type of terminal device. The commands of the second memory set are output commands for other terminal devices. The other terminal devices are the light switches and thermostats connected by the embodiments with a server 40. The pre-determined gesture profiles of these output commands can be more complex for the different terminal devices being controlled.

Figure 8:
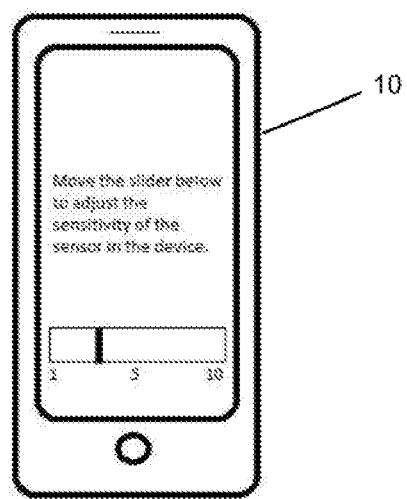
FIG. 8 is a schematic view of embodiments of the present invention with a sensitivity factor as part of the data pattern and the gesture profile in the step of matching the data pattern with a gesture profile.

The method of forming commands can include entering manual data input so as to form each gesture profile with each corresponding command. In the example of vibration with the sensor as an accelerometer, the manual data input includes values for vibration parameters, such as amplitude, intensity, duration, and amplitude pattern. In another embodiment, the manual data input can include a sensitivity factor so that the gesture profile and any detected data pattern must also have compatible sensitivity factors. FIG. 8 shows a schematic view of entering manual data input on a mobile device. The sensitivity factor controls the sensor so that the gesture profiles have a sensitivity factor. Consequently, the data patterns must also have a sensitivity factor or range of acceptable sensitivity factor in order to be matched for a corresponding command. The step of matching the subsequent data patterns includes matching the subsequent data patterns to pre-determined gesture profiles with a sensitivity factor.

Figure 9:
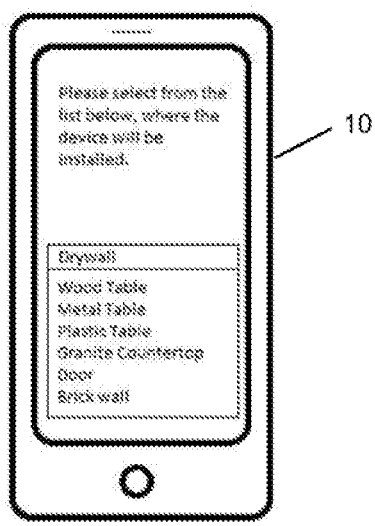
FIG. 9 is a schematic view of embodiments of the present invention with a surface selection factor as part of the data pattern and the gesture profile in the step of matching the data pattern with a gesture profile.

FIG. 9 shows a schematic view of entering manual data input on a mobile device for surface selection for either a vibration parameter or sound parameter, as another embodiment. A knocking gesture on granite or a knocking gesture on wood or another physical engagement with a surface in the interactive zone can be selected for the manual data input of the gesture profiles. The data patterns will now be considered against gesture profiles with a particular surface selection. The data patterns are matched against a certain group of gesture profiles for granite surfaces or wood surfaces, instead of the entire library for all surfaces. For example, the gesture profiles for granite surfaces may have pre-set values for vibration parameters, such as amplitude, intensity, duration, and amplitude pattern for granite surfaces. The step of matching the data patterns includes matching the data patterns to gesture profiles with a surface selection factor.

In another example, threshold factor can be a vibration parameter or sound parameter to form the gesture profiles. The step of matching the data patterns includes matching the data patterns to gesture profiles with a threshold factor. In the example of vibration with the sensor as an accelerometer, the vibration parameters include amplitude, intensity, duration, and amplitude pattern and threshold factor. A gesture profile has the threshold factor to set the range of duration for an acceptable match with a data pattern. The threshold factor may set a numerical range or a minimum or maximum amount, such as a data pattern with any duration value above 0.5 seconds. The duration value of the data pattern may need to exceed a duration value in order to match to a gesture profile with a command. In the example of sound with the sensor as an acoustic sensor, the audio parameters include volume, intensity, duration, and frequency pattern and threshold factor. A gesture profile has the threshold factor to set the range of duration for an acceptable match with a data pattern. The threshold factor may set a numerical range or a minimum or maximum amount, such as a data pattern with any volume between 20-23 decibels. The volume value of the data pattern may need to fit 20-23 decibels in order to match to a gesture profile with a command.

The method of the present invention also includes alternative embodiments of creating the gesture profiles for the commands. The method can be calibrated for a particular environment. Instead of manually entered values of audio parameters or vibration parameters, the gesture profiles are calibrated with actual values for vibration parameters, such as amplitude, intensity, duration, and amplitude pattern or actual values for audio parameters, such as volume, intensity, duration, and vibration pattern. The embodiment of the method includes making a calibration profile for each pre-determined gesture profile, and associating each pre-determined gesture profile with a corresponding command, including commands of either a first memory set of commands or a second memory set of commands. The calibration increases reliability of the command recognition on a given surface with particular surface attributes. The method enables a personalization, such that the knocking gesture by a particular individual on a particular surface is used to generate commands. The method can be set to reliably detect a knocking gesture on a surface with a particular shape, thickness, density and location within the interactive zone for a particular command. Each calibration profile is comprised of a corresponding calibration data pattern from corresponding calibration data signals. The corresponding calibration data signals are detected by the sensor, and a corresponding calibration contact interaction generates the corresponding calibration data signals. The system of the invention can be set to "calibration" so that contact interactions in the interactive zone are corresponding calibration contact interactions in the interactive zone in order to form the calibration profiles for the setting of gesture profiles with commands. For example, the step of making the calibration profile could be used for embodiment of FIG. 9 with surface selection as an audio or vibration parameter. Instead of pre-set manual input data for the audio or vibration parameters for different surfaces, each different surface can be sampled and tested in "calibration mode" of the system in order to form the gesture profiles of particular parameters detected in actual practice.

The present invention provide a method for forming commands based on knocking gestures, such as knocks, taps and other impact contacts. Physically engaging in the interactive zone set by a sensor on a mounting surface is a contact interaction. Contacting a surface, not necessarily the mounting surface, in the interactive zone is detected by the sensor. The data signals of the detected contact interaction by the sensor become data input and create a data pattern for the contact interaction. The data pattern is matched to a gesture profile with an associated command. These commands can be status commands for the sensor, power levels of the sensors, and power levels for other components of the control system. Depending upon the status of the sensor, the commands can be output commands for terminal devices connected to the control system. Associations of each command and a corresponding gesture profile can be set by manual data input or calibration. There can be two memory sets of commands for the different status of the sensor.

The foregoing disclosure and description of the invention is illustrative and explanatory thereof. Various changes in the details of the illustrated structures, construction and method can be made without departing from the true spirit of the invention.

We claim:
1. A method for controlling a resting status and a listening status, the method comprising the steps of:
installing a housing on a mounting surface by an engagement device, the housing being comprised of a sensor contained within the housing, and a microcontroller unit connected to said sensor, said sensor forming an interactive zone defined by a range of said sensor, said interactive zone being aligned with the mounting surface, said sensor being in a fixed position relative to said engagement device, said sensor having a first power consumption level so as to be in a resting status and a second power consumption level so as to be in a listening status, said sensor being in the resting status;
making a physical impact on the mounting surface so as to generate a contact interaction;
detecting the contact interaction as data signals with said sensor;
receiving said data signals from said sensor with said microcontroller unit;
determining a status data pattern corresponding to said data signals of the contact interaction with the microcontroller unit;
matching the status data pattern to a status gesture profile with the microcontroller unit, the status gesture profile being associated with a command to switch said sensor from the resting status to the listening status, the listening status corresponding to the second power consumption level, the second power consumption level being higher than the first power consumption level;
receiving the command and switching said sensor to the listening status;
controlling a terminal device, when said sensor is in the listening status;
maintaining said sensor in the listening status for a subsequent contact interaction within a set time duration; and
switching the listening status to the resting status when the subsequent contact interaction occurs after the set time duration passes,
wherein the step of controlling the terminal device further comprises the steps of:
connecting a server in communication with said sensor, the server being comprised of a routing module, a processing module being connected to the routing module, and an output module connected to the processing module;
connecting the terminal device in communication with the server, the terminal device being comprised of a receiving module;
making a subsequent physical impact on the mounting surface so as to generate the subsequent contact interaction, when said sensor is in the listening status and before the set time duration passes;
detecting the subsequent contact interaction as subsequent data signals with said sensor;
determining a subsequent data pattern with said microcontroller corresponding to the subsequent data signals of the subsequent contact interaction;
transmitting said subsequent data pattern to said routing module of said server;

matching the subsequent data pattern to a gesture profile with the processing module, the gesture profile being associated with an output command;

transmitting said output command to the receiving module of terminal device with the output module of the server, the command corresponding to activity of the terminal device; and performing the activity with the terminal device, and further comprising the steps of:

maintaining a memory set of commands corresponding to status gesture profiles in said microcontroller; and maintaining a memory set of output commands corresponding to gesture profiles in said processing module of said server.

2. The method for controlling, according to claim 1, wherein the step of making the subsequent physical impact on the mounting surface further comprises making a plurality of physical impacts on the mounting surface, the subsequent contact interaction being associated with more than one physical impact.

3. The method for controlling, according to claim 1, each of the subsequent data signals having a respective defined peak corresponding to each impact and a defined time period after a last defined peak, the subsequent data pattern being comprised of each defined peak and the defined time period after the last defined peak, wherein the step of matching said subsequent data pattern to said gesture profile comprises:

confirming each defined peak and the defined time period after the last defined peak of said subsequent data signals with each defined peak and the defined time period after the last defined peak of a respective gesture profile.

4. A method for controlling output, the method comprising the steps of:

installing a housing on a mounting surface by an engagement device, the housing being comprised of a sensor contained within the housing, and a microcontroller unit connected to said sensor, said sensor forming an interactive zone defined by a range of said sensor, said interactive zone being aligned with the mounting surface, said sensor being in a fixed position relative to said engagement device;

making a physical impact on the mounting surface so as to generate a contact interaction;

detecting the contact interaction as data signals with said sensor;

receiving said data signals from said sensor with said microcontroller unit;

determining a data pattern corresponding to said data signals of the contact interaction with the microcontroller unit;

connecting a server in communication with said sensor, the server being comprised of a routing module, a processing module being connected to the routing module, and an output module connected to the processing module;

connecting the terminal device in communication with the server, the terminal device being comprised of a receiving module;

transmitting said data pattern to said routing module of said server and said microcontroller;

matching said data pattern to a gesture profile, the gesture profile being associated with at least one of a group consisting of a command and an output command;

transmitting said command to said microcontroller;

transmitting said output command to the receiving module of terminal device with the output module of the server, the output command corresponding to activity of the terminal device; and performing the activity with the terminal device, further comprising the steps of:

maintaining a first memory set of commands in said microcontroller, said commands of said first memory set being status commands, each status command corresponding to a pre-determined status gesture profile;

maintaining a second memory set of commands in said processing module, said commands being output commands, each output command corresponding to a pre-determined gesture profile, wherein said terminal device is said sensor, said sensor having a first power consumption level so as to be in a resting status and a second power consumption level so as to be in a listening status, and wherein said activity is comprised of switching said sensor between the resting status and the listening status, the listening status corresponding to the second power consumption level, the second power consumption level being higher than the first power consumption level;

making a subsequent physical impact on the mounting surface so as to generate the subsequent contact interaction, when said sensor is in the listening status and before the set time duration passes;

detecting the subsequent contact interaction as subsequent data signals with said sensor;

determining a subsequent data pattern with said microcontroller corresponding to the subsequent data signals of the subsequent contact interaction;

transmitting said subsequent data pattern to said routing module of said server;

matching the subsequent data pattern to a subsequent gesture profile with the processing module, the subsequent gesture profile being associated with a subsequent output command for another terminal device and being selected from said second set of commands in said processing module;

transmitting said subsequent output command to a respective receiving module of said another terminal device with the output module of the server, the subsequent output command corresponding to a subsequent activity of said another terminal device; and performing the subsequent activity with said another terminal device.

5. The method for controlling output, according to claim 4, wherein said terminal device is said sensor, said sensor having a first power consumption level so as to be in a resting status and a second power consumption level so as to be in a listening status, and wherein said output command is comprised of a status command to switch said sensor from the resting status to the listening status, the listening status corresponding to the second power consumption level, the second power consumption level being higher than the first power consumption level.

6. The method for controlling output, according to claim 4, further comprising the steps of:

entering manual data input so as to form each pre-determined gesture profile; and associating each pre-determined gesture profile with a corresponding output command from at least one of said first memory set and said second memory set.

7. The method for controlling output, according to claim 6, wherein said manual data input is comprised of a sensitivity factor corresponding to a respective pre-determined gesture profile, and wherein the step of matching the subsequent data pattern to a subsequent gesture profile further comprises the steps of:
confirming a sensitivity factor of said subsequent data pattern to said sensitivity factor corresponding to said respective pre-determined gesture profile.

8. The method for controlling output, according to claim 6, wherein said manual data input is comprised of a surface selection factor corresponding to a respective pre-determined gesture profile, and
wherein the step of matching the subsequent data pattern to a subsequent gesture profile further comprises the steps of:
confirming a surface selection factor of said subsequent data pattern to said surface selection factor corresponding to said respective pre-determined gesture profile.

9. The method for controlling output, according to claim 6, wherein said manual data input is comprised of a threshold factor corresponding to a respective pre-determined gesture profile, and
wherein the step of matching the subsequent data pattern to a subsequent gesture profile further comprises the steps of:
confirming a threshold factor of said subsequent data pattern to exceed said threshold factor corresponding to said respective pre-determined gesture profile,
wherein said threshold factor is comprised of a value of a parameter of said data signals, said parameter being comprised of at least one of a group consisting of volume, frequency, intensity, duration and amplitude.

10. The method for controlling output, according to claim 4, further comprising the steps of:
forming said first memory set of commands and said second memory set of commands, the step of forming said first memory set of commands and said second memory set of commands comprising the steps of;
making a calibration profile for each pre-determined gesture profile, each calibration profile being comprised of corresponding calibration data signals, said corresponding calibration data signals being detected by said sensor, said corresponding calibration data signals being generated by a corresponding calibration contact interaction, said corresponding calibration contact interaction being in said interactive zone; and
associating each pre-determined gesture profile with each command of said first memory set of commands and said second memory set of commands.

11. The method for controlling output, according to claim 10, further comprising the steps of:
storing said first memory set of commands and said second memory set of commands in said processing module of said server; and
storing said first memory set of commands in said microcontroller.

12. The method for controlling output, according to claim 10, wherein each calibration contact interaction is a gesture in said interactive zone.

* * * * *